US010832038B2

(12) United States Patent
Werner et al.

(10) Patent No.: US 10,832,038 B2
(45) Date of Patent: Nov. 10, 2020

(54) REAL-TIME ANALYSIS OF PARTICIPANT UNDERSTANDING

(71) Applicant: INTERNATIONAL BUSINESS MACHINES CORPORATION, Armonk, NY (US)

(72) Inventors: John S. Werner, Fishkill, NY (US); Arkadiy O. Tsfasman, Wappingers Falls, NY (US); Pasquale A. Catalano, Wallkill, NY (US); Andrew G. Crimmins, Montrose, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 205 days.

(21) Appl. No.: 15/938,127

(22) Filed: Mar. 28, 2018

(65) Prior Publication Data
US 2019/0303655 A1 Oct. 3, 2019

(51) Int. Cl.
*G06F 15/173* (2006.01)
*G06K 9/00* (2006.01)
*G09B 5/00* (2006.01)

(52) U.S. Cl.
CPC ........... *G06K 9/00302* (2013.01); *G09B 5/00* (2013.01)

(58) Field of Classification Search
USPC ....... 382/100, 103, 107, 115, 155, 162, 168, 382/172–173, 181, 199, 209, 219, 224, 382/232, 254, 274, 276, 286–291, 305, 382/312; 709/219, 224; 434/350
See application file for complete search history.

(56) References Cited

U.S. PATENT DOCUMENTS

| | | | |
|---|---|---|---|
| 9,741,258 B1 * | 8/2017 | Chetlur | H04N 21/4532 |
| 2014/0337477 A1 * | 11/2014 | Fisher | G06T 7/70 709/219 |
| 2015/0099255 A1 * | 4/2015 | Aslan | G06Q 50/01 434/350 |
| 2016/0217321 A1 * | 7/2016 | Gottlieb | G06K 9/00308 |
| 2017/0169726 A1 * | 6/2017 | Aguirre | G09B 5/02 |
| 2017/0259115 A1 * | 9/2017 | Hall | G06F 19/00 |
| 2018/0005116 A1 | 1/2018 | Pickover et al. | |

* cited by examiner

*Primary Examiner* — Seyed H Azarian
(74) *Attorney, Agent, or Firm* — Cantor Colburn LLP; Teddi Maranzano (57) ABSTRACT

In one example implementation according to aspects of the present disclosure, a computer-implemented method includes capturing a plurality of images of the at least one participant during the presentation. The method further includes analyzing the plurality of images to determine a level of understanding of the at least one participant. The method further includes determining a period of misunderstanding of the at least one participant by comparing the level of understanding of the at least one participant to an understanding threshold, the period of misunderstanding being a period of time during which the level of understanding of the at least one participant is below the understanding threshold. The method further includes, based at least in part on determining that the level of understanding of the at least one participant is below the understanding threshold, analyzing the presentation to associate the period of misunderstanding with a portion of the presentation.

18 Claims, 8 Drawing Sheets

REAL-TIME ANALYSIS OF PARTICIPANT UNDERSTANDING

BACKGROUND

The present invention generally relates to data processing and more specifically to the real-time analysis of participant understanding during a presentation.

Multimedia presentations through conferencing systems are becoming more common. For any particular presentation, there is typically a wide variety of participant interest, company, group, or department membership, technical knowledge, security authorization, and so on. As a result, participant interest may wain during portions of a multimedia presentation, especially in an online conferencing environment.

SUMMARY

Embodiments of the present invention are directed to a computer-implemented method for real-time analysis of participant understanding of at least one participant during a presentation. A non-limiting example of the computer-implemented method includes capturing, by an imaging device, a plurality of images of the at least one participant during the presentation. The method further includes analyzing, by a processing device, the plurality of images to determine a level of understanding of the at least one participant. The method further includes determining, by the processing device, a period of misunderstanding of the at least one participant by comparing the level of understanding of the at least one participant to an understanding threshold, the period of misunderstanding being a period of time during which the level of understanding of the at least one participant is below the understanding threshold. The method further includes, based at least in part on determining that the level of understanding of the at least one participant is below the understanding threshold, analyzing, by the processing device, the presentation to associate the period of misunderstanding with a portion of the presentation.

Embodiments of the present invention are directed to a system. A non-limiting example of the system includes a memory comprising computer readable instructions and a processing device for executing the computer readable instructions for performing a method for real-time analysis of participant understanding of at least one participant during a presentation. A non-limiting example of the method includes capturing, by an imaging device, a plurality of images of the at least one participant during the presentation. The method further includes analyzing, by a processing device, the plurality of images to determine a level of understanding of the at least one participant. The method further includes determining, by the processing device, a period of misunderstanding of the at least one participant by comparing the level of understanding of the at least one participant to an understanding threshold, the period of misunderstanding being a period of time during which the level of understanding of the at least one participant is below the understanding threshold. The method further includes, based at least in part on determining that the level of understanding of the at least one participant is below the understanding threshold, analyzing, by the processing device, the presentation to associate the period of misunderstanding with a portion of the presentation. The method further includes re-presenting to the at least one participant the portion of the presentation associated with the period of misunderstanding.

Embodiments of the invention are directed to a computer program product. A non-limiting example of the computer program product includes a computer readable storage medium having program instructions embodied therewith. The program instructions are executable by a processor to cause the processor to perform a method for real-time analysis of participant understanding of at least one participant during a presentation. A non-limiting example of the method includes capturing, by an imaging device, a plurality of images of the at least one participant during the presentation. The method further includes analyzing, by a processing device, the plurality of images to determine a level of understanding of the at least one participant. The method further includes determining, by the processing device, a period of misunderstanding of the at least one participant by comparing the level of understanding of the at least one participant to an understanding threshold, the period of misunderstanding being a period of time during which the level of understanding of the at least one participant is below the understanding threshold. The method further includes, based at least in part on determining that the level of understanding of the at least one participant is below the understanding threshold, analyzing, by the processing device, the presentation to associate the period of misunderstanding with a portion of the presentation. The method further includes re-presenting to the at least one participant the portion of the presentation associated with the period of misunderstanding.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number corresponds to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
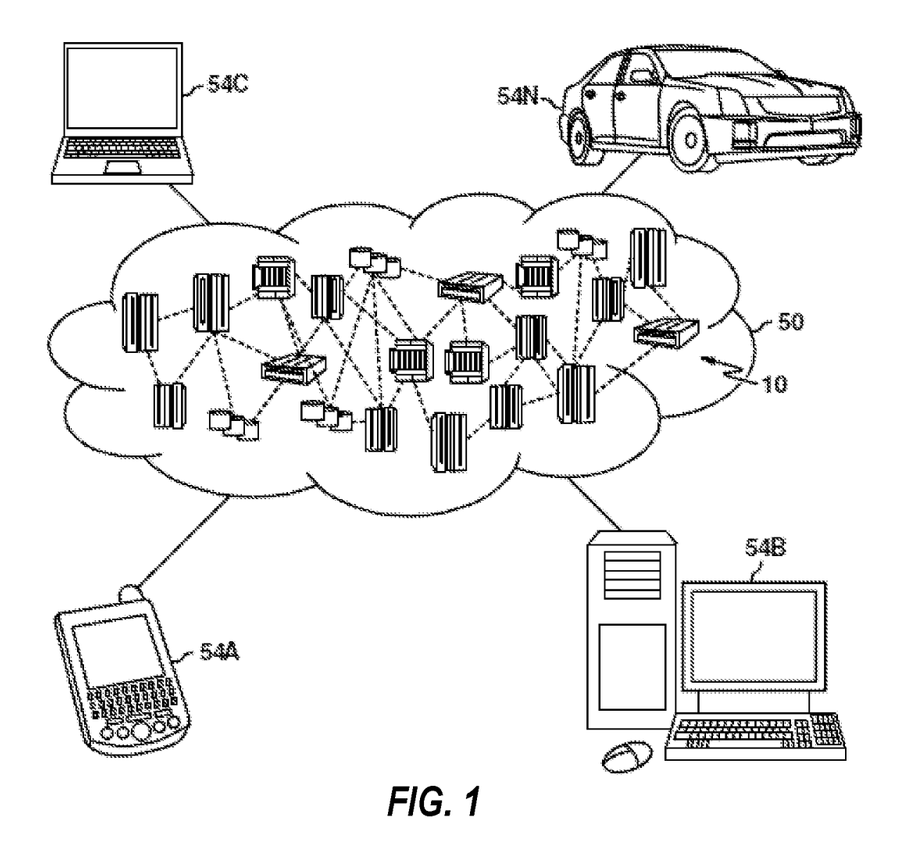
FIG. 1 depicts a cloud computing environment according to aspects of the present disclosure.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
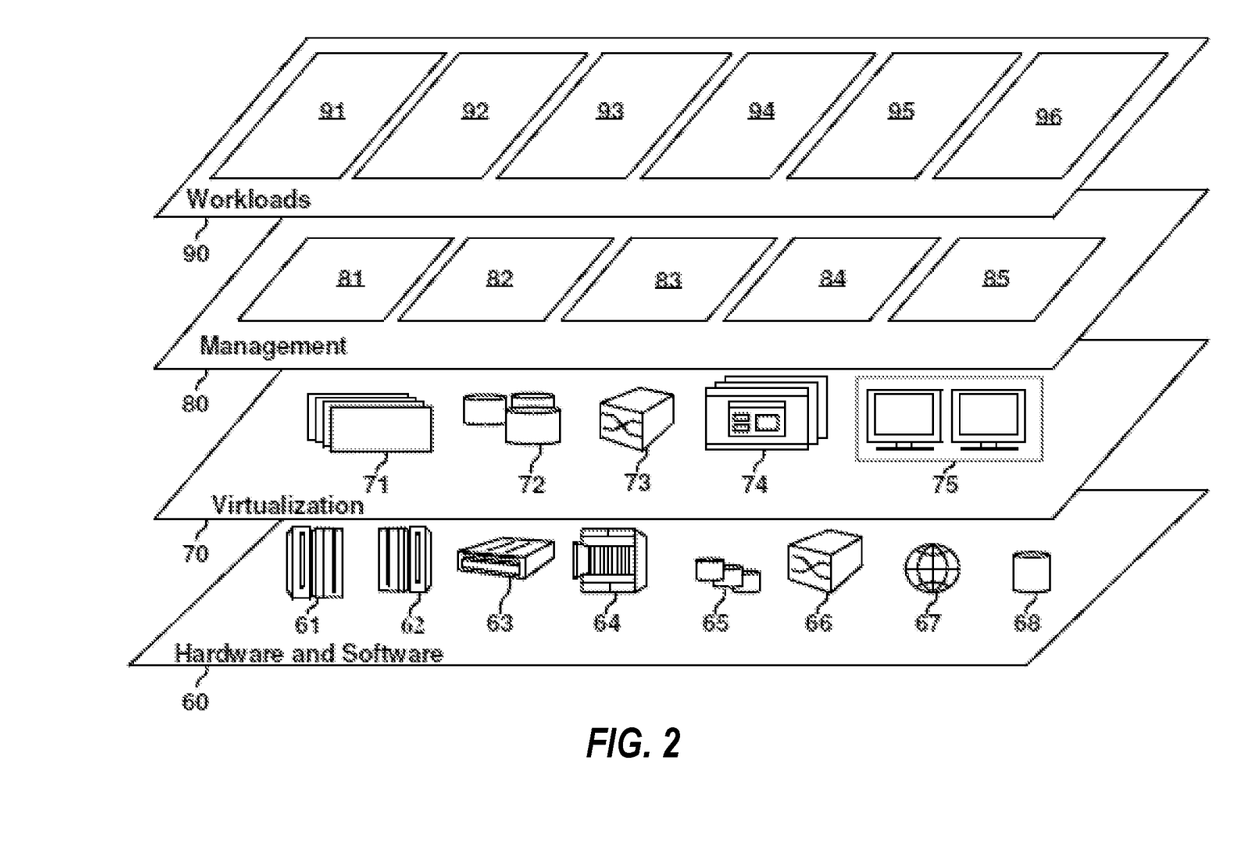
FIG. 2 depicts abstraction model layers according to aspects of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and real-time analysis of audience understanding 96.

Figure 3:
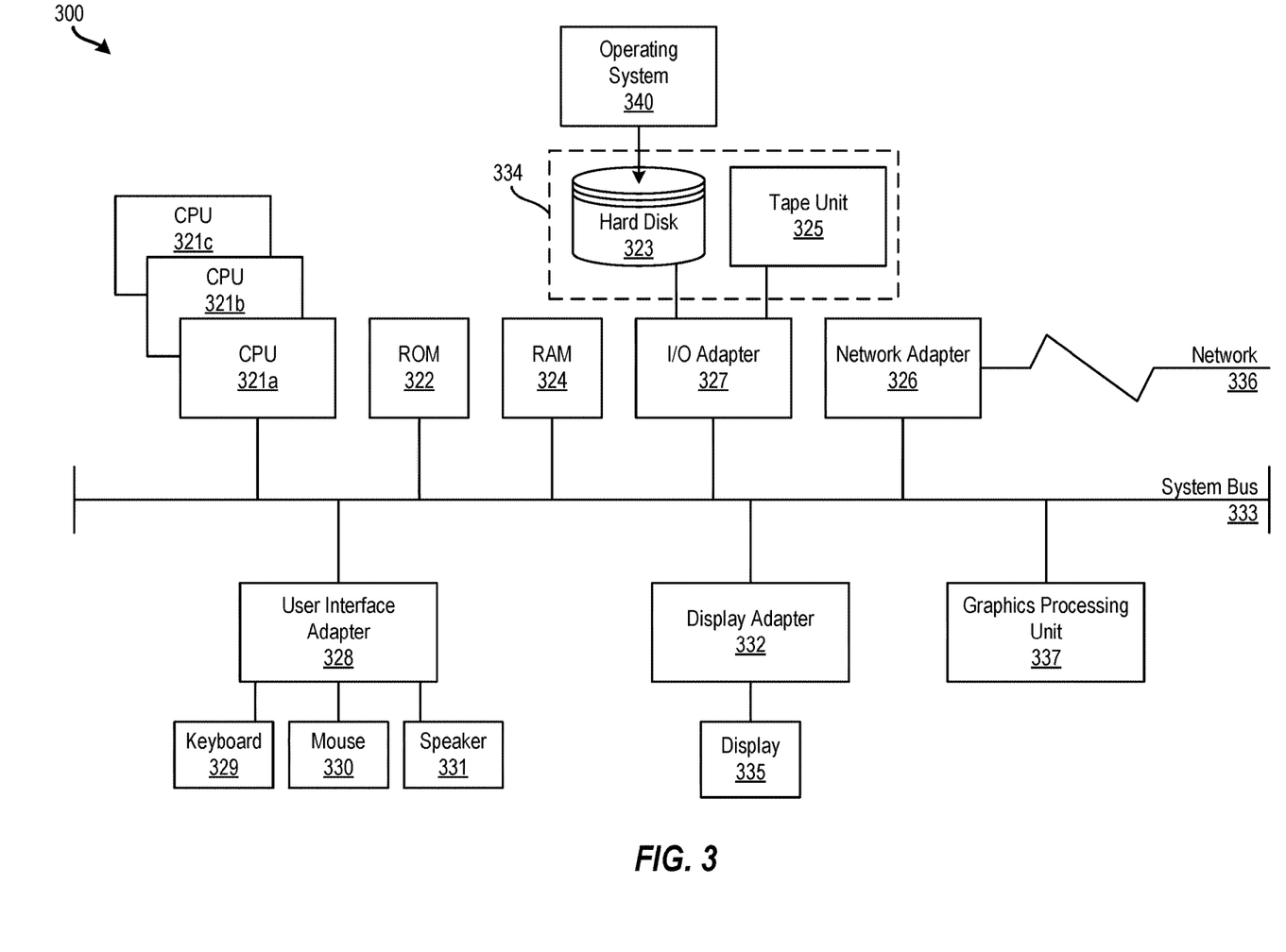
FIG. 3 depicts a block diagram of a processing system for implementing the techniques described herein according to aspects of the present disclosure.

It is understood that the present disclosure is capable of being implemented in conjunction with any other type of computing environment now known or later developed. For example, FIG. 3 depicts a block diagram of a processing system 300 for implementing the techniques described herein. In examples, processing system 300 has one or more central processing units (processors) 321a, 321b, 321c, etc. (collectively or generically referred to as processor(s) 321 and/or as processing device(s)). In aspects of the present disclosure, each processor 321 can include a reduced instruction set computer (RISC) microprocessor. Processors 321 are coupled to system memory (e.g., random access memory (RAM) 324) and various other components via a system bus 333. Read only memory (ROM) 322 is coupled to system bus 333 and may include a basic input/output system (BIOS), which controls certain basic functions of processing system 300.

Further depicted are an input/output (I/O) adapter 327 and a communications adapter 326 coupled to system bus 333.

I/O adapter 327 may be a small computer system interface (SCSI) adapter that communicates with a hard disk 323 and/or a tape storage drive 325 or any other similar component. I/O adapter 327, hard disk 323, and tape storage device 325 are collectively referred to herein as mass storage 334. Operating system 340 for execution on processing system 300 may be stored in mass storage 334. A network adapter 326 interconnects system bus 333 with an outside network 336 enabling processing system 300 to communicate with other such systems.

A display (e.g., a display monitor) 335 is connected to system bus 333 by display adaptor 332, which may include a graphics adapter to improve the performance of graphics intensive applications and a video controller. In one aspect of the present disclosure, adapters 326, 327, and/or 232 may be connected to one or more I/O busses that are connected to system bus 333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 333 via user interface adapter 328 and display adapter 332. A keyboard 329, mouse 330, and speaker 331 may be interconnected to system bus 333 via user interface adapter 328, which may include, for example, a Super 110 chip integrating multiple device adapters into a single integrated circuit.

In some aspects of the present disclosure, processing system 300 includes a graphics processing unit 337. Graphics processing unit 337 is a specialized electronic circuit designed to manipulate and alter memory to accelerate the creation of images in a frame buffer intended for output to a display. In general, graphics processing unit 337 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 321, storage capability including system memory (e.g., RAM 324), and mass storage 334, input means such as keyboard 329 and mouse 30, and output capability including speaker 331 and display 335. In some aspects of the present disclosure, a portion of system memory (e.g., RAM 324) and mass storage 334 collectively store an operating system such as the AIX® operating system from IBM Corporation to coordinate the functions of the various components shown in the processing system 300.

Turning now to an overview of technologies that are more specifically relevant to aspects of the invention, it can be difficult for a presenter to evaluate and understand participants' level of understanding of the presentation. A participant is one who attends, participates in, or is otherwise present (in whole or in part) at an event, meeting, function, or the like. For example, during remote meetings (e.g., in an online presentation or conferencing environment), presenters often have no idea how well participants understand the presentation materials. For in-person meetings where there are many participants, it is hard for a meeting presenter to track each participant's understanding. In a classroom environment, where a presenter may continually turn his back to the participants (e.g., to write on a whiteboard), it may be hard to track the point when students no longer understand the material being presented.

Without seeing participant reaction (e.g., facial expressions, mood, body language, etc.), a presenter does not know if the presentation is going well or if the content is understood. These issues often result in wasted time, poor performance, messages not being conveyed, loss of interest, etc. Without a participant speaking up, it can be difficult for a presenter to be notified on how well the participants understand the presentation, the exact point at which participants lost understanding, and whether a presenter should pause and/or repeat or rephrase some of the presented materials and how far back the presenter should go when repeating content.

Turning now to an overview of the aspects of the invention, one or more embodiments of the invention address the above-described shortcomings of the prior art by capturing images/video of participants' faces and performing facial microexpression analysis to define each participant's status (e.g., good understanding, partial understanding, confusion, etc.). Microexpression analysis analyzes involuntary facial expressions shown on human faces according to emotions experienced. Microexpression analysis can be useful to determine whether a meeting/presentation participant understands the content of the presentation, for example. A camera on a participant's device (e.g., laptop, mobile phone, webcam, etc.) captures the participant's facial expressions during remote meetings. During live meetings and in classroom environments, cameras can be positioned throughout the room to capture images/video of the faces of the participants.

The present techniques analyze an audio/video recording of the presenter to associate with the participant microexpression analysis to identify tokens or movements where there was a change in understanding. Captured data is aggregated into a graphical summary and provided to the presenter to give the overall status of participant understanding. Presenters may have an ability to view live participant feedback data (e.g., the graphical summary, output graphs, highlighting presentation text that was not understood, etc.) to determine at which point the participant understanding changed. This enables the presenter to react "on the fly" during the presentation (e.g., pause, slow down, repeat materials, prompt for questions, continue, etc.). This will also enable presenters who make the same presentation multiple times (e.g., a teacher, a salesperson, etc.) to improve future presentations by learning what was and was not effective to improve participant understanding.

The above-described aspects of the invention address the shortcomings of the prior art by monitoring and analyzing participant understanding, which can include whether a participant (or group of participants) understood the material being presented, was paying attention, lost interest, and the like. In some examples, such monitoring and analysis can be performed in real-time or near-real-time to provide feedback to the presenter to enable the presenter to repeat information that may not have been understood. In other examples, the monitoring and analysis can be performed subsequent to the presentation to enable the presenter to modify future similar presentations based on participant understanding.

Figure 4:
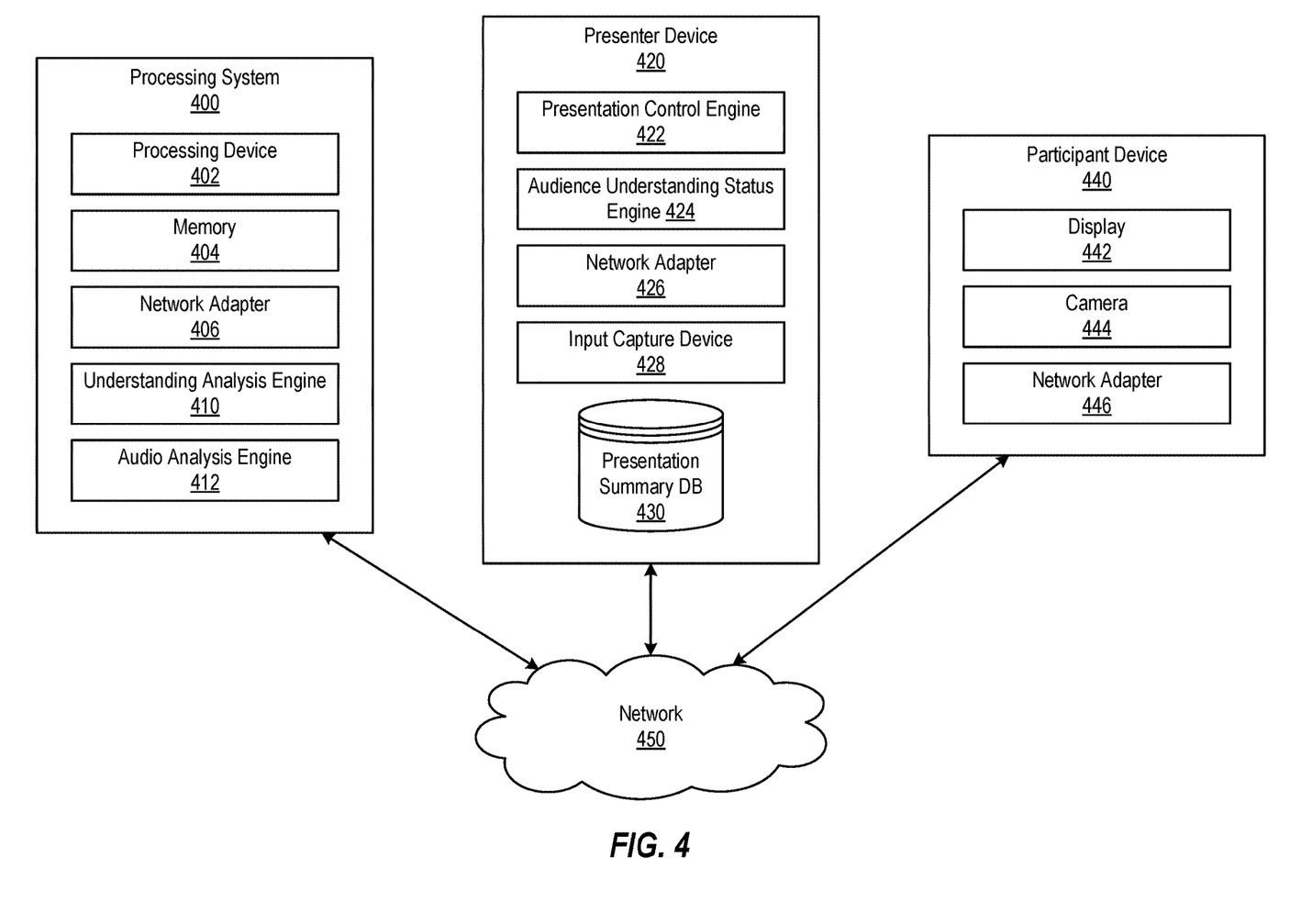
FIG. 4 depicts a block diagram of a processing system for real-time analysis of participant understanding during a presentation according to aspects of the present disclosure.

Turning now to a more detailed description of aspects of the present invention, FIG. 4 depicts a block diagram of a processing system for real-time analysis of participant understanding during a presentation according to aspects of the present disclosure. FIG. 4 particularly includes a processing system 400, a presenter device 420, and a participant device 440.

The various components, modules, engines, etc. described regarding FIG. 4 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include a processing device (e.g., a processing device 402) for executing those instructions. Thus, a system memory (e.g., a memory 404) can store program instructions that when executed by the processing device (e.g., the processing device 402) to implement the engines described herein. Other engines can also be utilized to include other features and functionality described in other examples herein.

The processing system 400 includes the processing device 402, the memory 404, a network adapter 406 (e.g., the network adapter 326), an understanding analysis engine 410, and an audio analysis engine 412. The understanding analysis engine 410 performs facial microexpression and/or body language analysis on attendees to determine their level of understanding as well as analysis on captured video/audio of the presenter (e.g., mannerisms or things going on in the background that could distract attendees causing them to miss details and lead to confusion). The audio analysis engine 412 converts audio to text (e.g., using a text-to-speech API from IBM Watson®) and performs tokenization to relate the audio to portions of the presentation. The network adapter 406 receives data from presenter device 420 and/or the participant device 440, which can include captured video of the attendee, captured video of the presenter, captured audio of the presenter, etc.

It should be appreciated that the processing system 400 can be integrated into or can operate in combination with a web, video, and/or audio conferencing system. In one or more aspects of the present disclosure, the understanding analysis engine 410 and/or the audio analysis engine 412 can be integrated into the presenter device 420 and/or in a cloud computing environment (e.g., the cloud computing environment 50) such that the processing system 400 is not used or needed.

The presenter device 420 includes a presentation control engine 422, an audience understanding status engine 424, a network adapter 426 (e.g., the network adapter 326), an input capture device 428, and a presentation summary database 430. Although not depicted, the presenter device 420 can also include a processing device and/or a memory for executing program instructions to implement the engines of the presenter device 420. The presentation control engine 422 provides a presentation control mechanism to present and manage slides, text, images, etc. and share them with attendees. The audience understanding status engine 424 receives data from the processing system 400 (e.g., via the network 450) about the attendees, aggregates the data, and displays live aggregated data to the presenter. The input capture device 428 includes a microphone and/or camera to capture audio, images, and/or video of the presenter (e.g., what is being said/done by the presenter). The network adapter 426 transmits the presentation to attendees, transmits captured microphone and/or camera data to the processing system 400 for analysis, and receives data from the understanding analysis engine 410 on the processing system 400. The presentation summary database 430 contains the presentation, previous versions of the presentation, and a summary of the data related to the presentation such that it can be referenced by the presenter to make updates to future presentations based on what worked and what did not work in terms of audience understanding. Although only a single presenter device 420 is depicted, additional presenter devices can also be implemented.

The participant device 440 includes a display 442, a camera 444, and a network adapter 446 (e.g., the network adapter 326). Although not depicted, the presenter device 420 can also include a processing device and/or a memory for executing program instructions. The participant device 440 can be a personal device (e.g., a laptop, a smartphone, etc.) of a participant or a device (e.g., a smartboard, interactive display, etc.) located in a presentation area (e.g., a classroom, auditorium, conference room, etc.). The display 442 displays the content of the presentation to the attendee and in some examples can have an integrated audio output device (or be associated with a separate audio output device) to present audio to the participant. The camera 444 captures video of the participant(s) for understanding analysis. The captured video may or may not be viewable by the presenter and/or other participants. The network adapter 446 receives the presentation and transmits captured camera data to the processing system 400 for analysis by the understanding analysis engine 410. Although only a single participant device 440 is depicted, additional participant devices can also be implemented.

A network 450 enables the processing system 400, the presenter device 420, and/or the participant device 440 to be in electronic communication with one another. For instance, the network adapter 406 of the processing system 400 enables the processing system 400 to communicative electronically with the presenter device 420 (using the network adapter 426) and/or the participant device 440 (using the network adapter 446) via the network 450. The network 450 (e.g., the outside network 336) can include any suitable network, such as a local area network, an intranet, the Internet, a wide area network, etc. and can utilize any suitable communication protocol (e.g., Ethernet, WiFi, Bluetooth, radio frequency, infrared, Near Field Communication, etc.). The connections (depicted as arrows) between the network 450 and the processing system 400, the presenter device 420, and the participant device 440 respectively can include wired and/or wireless connections.

Figure 5:
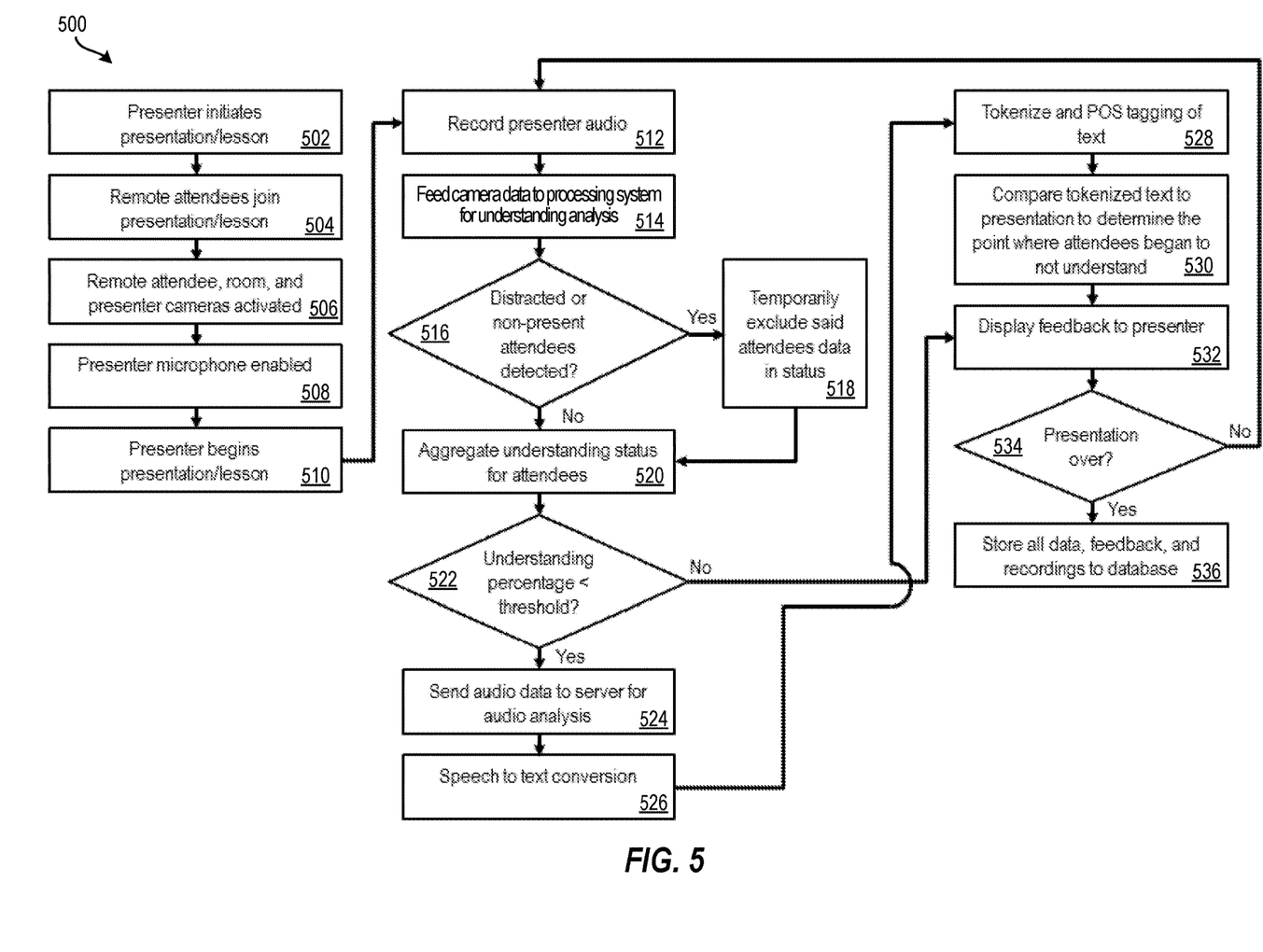
FIG. 5 depicts a flow diagram of a method for real-time analysis of participant understanding during a presentation according to examples of the present disclosure.

FIG. 5 depicts a flow diagram of a method 500 for real-time analysis of participant understanding during a presentation according to examples of the present disclosure. The method 500 can be performed by any suitable processing device or processing system, such as the processing system 300 of FIG. 3, the processing system 400 of FIG. 4, or the like.

At block 502, the presenter initiates a presentation (or lesson) using the presenter device 420 to present a presentation to a participant(s). At block 504, a remote participant(s), who is geographically separated from the presenter, joins the presentation. The remote participant(s) is in a different geographic location (e.g., a different room, a different building, a different geographic region, etc.) such that the participant(s) is geographically remote from the presenter. In some examples, the participant(s) is not geographically remote from the presenter (i.e., the presenter and the participant(s) are in the same location). The remote participant(s) can join through a network connection (e.g., the network 450) on their participant device(s) 440 (e.g., a computer, laptop, mobile device, etc.) so that the presentation is presented to the participant(s) on the participant device 440.

At block 506, imaging devices (e.g., the input capture device 428, the camera 444, etc.) are activated for the presenter and the participant(s). Cameras can be in a lecture hall, classroom, conference room, or other location in which one or more participant(s) and/or the presenter is located. In some examples, the captured images are used for analysis purposes and are not otherwise accessible by the participant(s). The images may or may not be available to the presenter. In some examples, the participant(s) can grant authorization for storage of captured images.

A presenter microphone (e.g., the input capture device 428) is then enabled at block 508. The microphone can be separate from or integrated into a video capture device (i.e., a camera). At block 510, the presenter begins the presentation using the presentation control engine 422 and the input capture device 428 records the presentation at block 512.

At block 514, images are captured of the participant's face(s) using the camera 444, and the captured images are sent to the processing system 400 for analysis. In particular, the understanding analysis engine 410 analyzes the captured images for expressions/microexpressions that indicate a level of understanding. The level of understanding can be used to determine whether a participant (or a group of participants) understands or does not understand (misunderstands) the presentation. Signs of misunderstanding can include having one eyebrow higher than the other, wrinkled nose and crease between the eyebrows, raised corner of the mouth on the side of the lower eyebrow, tilting of the head, moving the head in towards the display (e.g., the display 442), lips pursed together, etc. Audio from a participant asking a question or posting a comment in a presentation chat room can also be analyzed by the understanding analysis engine 410 to determine the level of understanding.

In some examples, a subset of a plurality of participants can be selected (e.g., by the presenter, automatically, etc.) for understanding analysis. For example, if a presenter is presenting to a large group of co-workers but is particularly interested in whether a few select members (e.g., managers) understand the presentation.

During the analysis, the understanding analysis engine 410 can determine if any participants are distracted or not present at decision block 516. A participant can be determined to be not present due to the participant's face not being detected in the frame (e.g., a participant connected to a web meeting but left their participant device). A participant can be determined to be distracted based on extracted data from the participant's participant device showing that the participant is actively using an alternative program or application during the presentation (e.g., playing a game, browsing the web, etc.). A participant can also be determined to be distracted based on analyzed video cues such as eye tracking (e.g., the participant is not looking at the display 442), the participant turns their head away from the display 442 for a period of time or a certain number of times during a period of time, etc. If a participant is determined to be distracted on not present at decision block 516, data from the distracted or not present participant can be excluded from the analysis at block 518.

At block 520, level of understanding data is aggregated to calculate a cumulative understanding level for a plurality of participants. This block can be skipped in the case of a single participant. Data from non-present and/or distracted participants can be temporarily excluded (i.e., the data can be included again later in the aggregated results at block 520 if it is deemed that the participant(s) are in fact present and no longer distracted. In some examples, an adjustment factor can be included for participants such that their understanding level is not given as much weight as participants that were paying attention the entire time. For example, a participant who was distracted during the beginning of the presentation can later be confused because they missed background material earlier in the presentation that was necessary to understand a later topic).

At decision block 522, it is determined whether the level of understanding is less than an understanding threshold. In some examples, decision block 522 can be skipped such that audio is always analyzed. This can be useful to presenters who repeat the same presentation multiple times (e.g., a teacher, a salesman, etc.) to know what presentation techniques worked and which ones did not work. If it is determined at decision block 522 that the understanding threshold is satisfied (i.e., the level of understanding is not less than the understanding threshold), the method 500 proceeds to block 532, and feedback is provided to the presenter as discussed in detail herein. However, if it is determined at decision block 522 that the level of understanding is less than the understanding threshold, the method 500 proceeds to block 524.

At block 524, audio data is sent to the processing system 400 for audio analysis. Speech-to-text conversion occurs at block 526 to convert the audio data to text. This can be accomplished using various speech-to-text technologies, such as IBM Watson's speech-to-text API. Once the speech-to-text conversion occurs, the text is then tokenized and part-of-speech (POS) tagged at block 528. In particular, the text is tokenized and POS tagged to determine the presenter's location within the presentation such as by using natural language processing (NLP). IBM Watson's natural language classifier API and tone analyzer API can be used to perform the tokenization and/or POS tagging and to provide the emotion and communication style that was portrayed in the text.

Presenters typically do not read directly from the presentation; however, the tokenization and POS tagging can be used to classify and understand the presenter's spoken words and determine data within the presentation that most closely matches. The audio can be time stamped, and the time-stamped audio can be compared, at block 530, to the point when the level of understanding begins dropping and eventually falls under the threshold such that the presenter knows exactly where the participant confusion began. This is graphically illustrated in FIG. 6.

Figure 6:
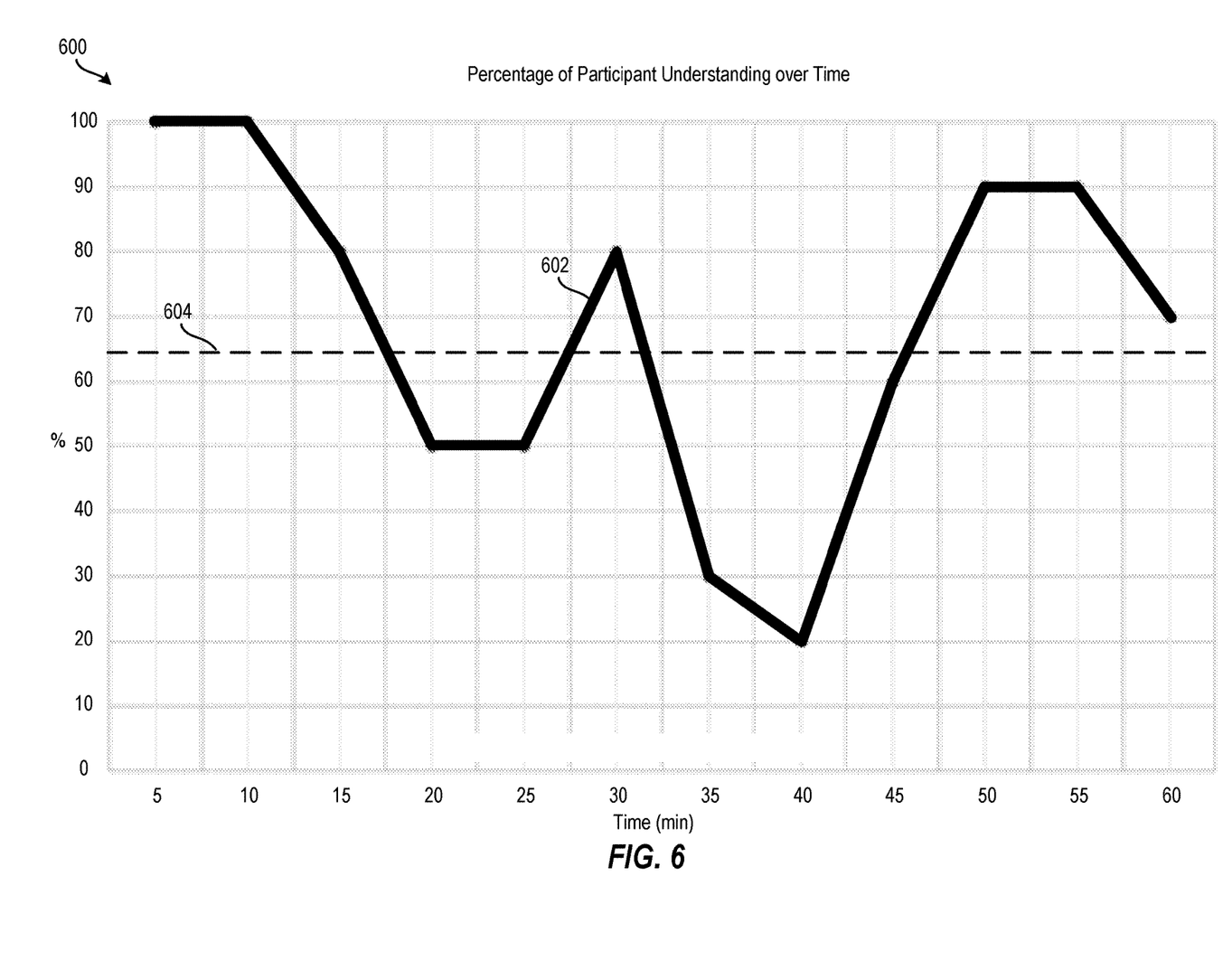
FIG. 6 depicts a graph of participant understanding for a group of participants as a percentage according to aspects of the present disclosure.

The participant level of understanding for a group of participants as a percentage is graphically depicted in the graph 600 of FIG. 6 according to aspects of the present disclosure. In particular, the graph 600 shows the level of understanding 602 for a group of participants (i.e., an aggregated level of understanding). The understanding threshold 604 is also depicted. As can be seen from the graph 600, the level of understanding 602 dropped below the understanding threshold 604 for example, at approximately 17.5 minutes. The level of understanding 602 remained below the understanding threshold 604 until approximately the 27.5-minute mark. The level of understanding 602 again dropped below the understanding threshold 604 for the period between approximately 31 minutes and 46 minutes. The level of understanding may have recovered in both scenarios because the presenter witnessed a loss of understanding and began describing the subject matter in a different way so as to help the audience understand. Without this feedback, the presenter would not have known that the audience did not understand, they would not have gone into greater detail, and the audience never would have grasped the topic within the presentation.

Returning to FIG. 5, at block 532, feedback is displayed to the presenter. In one example, a feedback graph is provided that displays percentage of participants that understand the material presented at a given time (e.g., the graph 600 of FIG. 6) or at a given slide number within the presentation. For smaller groups or individual participants of interest to the presenter, a text or pictorial output could be displayed to the presenter (e.g., a color, an emoji, etc. to indicate good understanding, somewhat understanding, confusion, etc.). Each participants' status can be displayed on the presenter device 420 without the actual video/images that were captured of the participant. If the presenter is presenting from a file (e.g., a PowerPoint presentation, a spreadsheet, a document, etc.) text within the presentation could be highlighted or otherwise marked such that the presenter knows the point where the audience begins losing understanding.

The presenter can use this feedback during the presentation to determine if the presenter should continue or return to the prior material to further explain or elaborate on the point where the participant(s) lost understanding. For example, the presenter can determine that the confusion occurred on a specific bullet point in the presentation that is of little significance and will not impact the remainder of the presentation and may choose to ignore the feedback during the current presentation. But the presenter can later alter that point or remove it in future presentations. In another example, the presenter can determine that the confusion occurred on a fundamental point during a lesson where students will be further confused if the fundamentals are not understood so the presenter may choose to pause (i.e., not continue with the presentation) and return to the fundamentals such that the presenter can explain the materials in a different way to help the students understand. In yet another example, the presenter can be reminded when reaching a certain point in the presentation that understanding of a similar point mentioned previously was associated with a low level of understanding such that the presenter can repeat the old material at that time (e.g., a participant may need to understand the background on slide 3 or the participant is not likely to understand what is presented on slide 5, so the presenter is notified of this low level of understanding when the presentation advances to slide 5).

At decision block 534, it is determined whether the presentation is over and, if not, the participant level of understanding monitoring continues by returning to step 512. However, if it determined that the presentation is over, the data (e.g., the presentation, captured images, feedback information, recordings, etc.) are stored at block 536 in a database such that they can be accessed by the presenter and/or others at a later time.

Additional processes also may be included, and it should be understood that the process depicted in FIG. 5 represents an illustration, and that other processes may be added or existing processes may be removed, modified, or rearranged without departing from the scope and spirit of the present disclosure.

Figure 7:
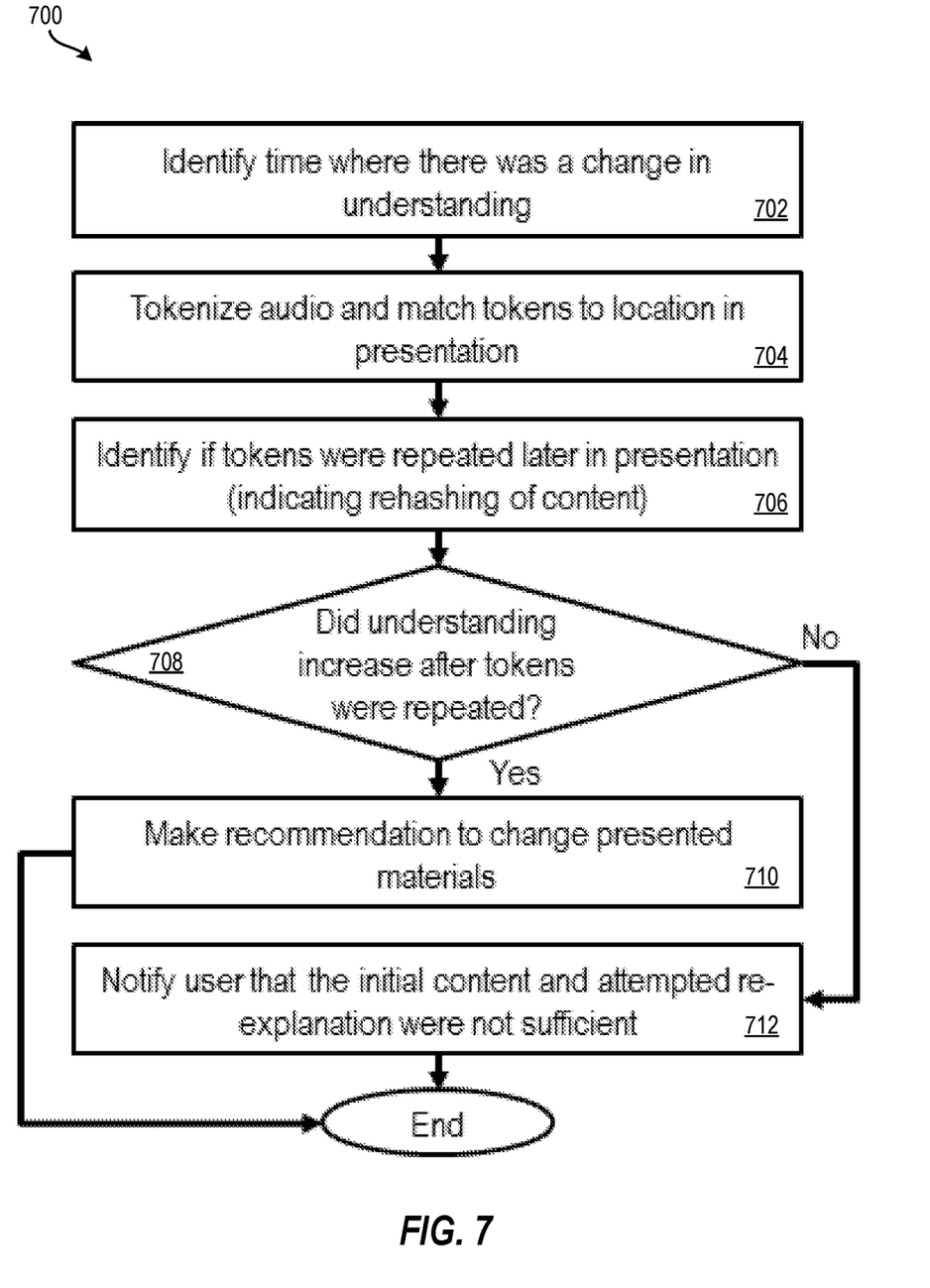
FIG. 7 depicts a flow diagram of a method for after-presentation analysis of participant understanding during a presentation according to aspects of the present disclosure.

FIG. 7 depicts a flow diagram of a method 700 for after-presentation analysis of participant understanding during a presentation according to aspects of the present disclosure. The method 700 can be performed by any suitable processing device or processing system, such as the processing system 300 of FIG. 3, the processing system 400 of FIG. 4, or the like.

The understanding feedback that is provided during the presentation (as described with reference to FIG. 5) can be analyzed to determine where changes in understanding occurred. At block 702, a time where there was a change in understanding is identified. These changes can be both positive and negative changes. At block 704, audio is tokenized and matched to a location in the presentation where changes in understanding occurred. At block 706, areas where tokens were repeated (indicating that the presenter rehashed content) are identified.

At decision block 708, it is determined whether understanding increased after tokens were repeated. If at decision block 708, understanding increased, it can be recommended to the presenter to change the presentation materials (e.g., re-order the materials, revise the materials, etc.) to prevent misunderstanding at block 710. If at decision block 708, understanding did not increase, the presenter is notified that the initial content and attempted re-explanation (e.g., re-presentation) were not sufficient to correct the misunderstanding at block 712. The re-explained or re-presented content can be content presented in a new or different way than in the original presentation. Such notification can include the initial text and re-explained text such that the presenter knows which areas of the presentation should be changed and so the presenter has information on what did work and what did not work in the presentation.

Additional processes also may be included, and it should be understood that the process depicted in FIG. 7 represents an illustration, and that other processes may be added or existing processes may be removed, modified, or rearranged without departing from the scope and spirit of the present disclosure.

Figure 8:
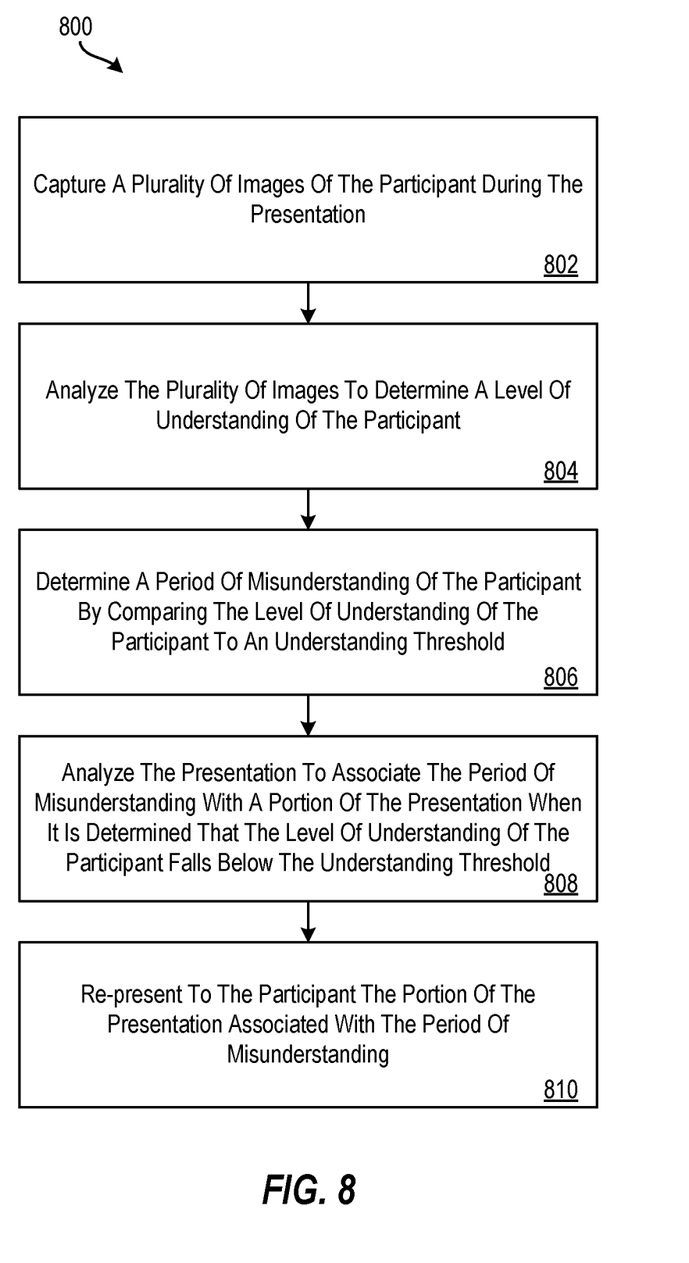
FIG. 8 depicts a flow diagram of a method for real-time analysis of participant understanding during a presentation according to examples of the present disclosure.

FIG. 8 depicts a flow diagram of a method 800 for real-time analysis of participant understanding during a presentation according to examples of the present disclosure. The method 800 can be performed by any suitable processing device or processing system, such as the processing system 300 of FIG. 3, the processing system 400 of FIG. 4, or the like.

At block 802, an imaging device (e.g., the camera 444) captures a plurality of images of the participant(s) during the presentation. The participant(s) can be in a different location (i.e., remote) than the presenter and/or from each other. The same or a different imaging device (e.g., the input capture device 428) can capture video and/or audio associated with the presentation. This can include video/audio of the presenter and/or the presentation itself.

At block 804, the understanding analysis engine 410 analyzes the plurality of images to determine a level of understanding of the participant(s), the period of misunderstanding being a period of time during which the level of understanding of the participant(s) is below the understanding threshold. To perform the analysis, the understanding analysis engine 410 can perform a microexpression facial analysis. At block 806, the understanding analysis engine 410 determines a period of misunderstanding of the participant(s) by comparing the level of understanding of the participant(s) to an understanding threshold. The period of misunderstanding represents a time period during which the participant(s) does not understand the presentation, does not understand a concept contained in the presentation, is confused about a concept contained in the presentation, is distracted or not paying attention, and the like. In some examples, the period of misunderstanding can be determined for one participant individually or collectively for a group of participants.

At block 808, based at least in part on determining that the level of understanding of the participant(s) is below the understanding threshold, the understanding analysis engine 410 analyzes the presentation to associate the period of misunderstanding with a portion of the presentation. At block 810, the presenter represents to the participant(s) the portion of the presentation associated with the period of misunderstanding. Re-presenting the portion of the presentation associated with the period of misunderstanding can include presenting the portion of the presentation in a different way.

Additional processes also can be included. It should be understood that the process depicted in FIG. 8 represents an illustration, and that other processes can be added or existing processes can be removed, modified, or rearranged without departing from the scope and spirit of the present disclosure. The method 800 enables the presenter to recognize and correct a participant(s) lack of understanding and/or to improve the presentation for future use.

In a classroom environment, smartboards can be used instead of a typical presentation. Classroom understanding can be calculated with a live recording and analysis of the smartboard session. The techniques presented herein can then work in a similar fashion by indicating points of content written on the smartboard that caused confusion for the class/participants. In such cases, the teacher/presenter can be facing the smartboard and cannot therefore know the exact point at which a student(s) lost understanding. Feedback can be provided to the teacher/presenter on a portion of the smart-board, adding a glow effect to the written content that caused confusion, and/or on a separate device (e.g., the teacher's smartphone).

According to aspects of the present disclosure, feedback can be shared between multiple teachers teaching similar material such that suggestions can be made based on the method that works best for student understanding. For example, a teacher explains content in a manner that is well understood so that lesson plans can be referenced by other teachers teaching similar content.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for real-time analysis of participant understanding of at least one participant during a presentation, the method comprising:
    capturing, by a first imaging device, a plurality of images of the at least one participant during the presentation;
    analyzing, by a processing device, the plurality of images to determine a level of understanding of the at least one participant;
    determining, by the processing device, a period of misunderstanding of the at least one participant by comparing the level of understanding of the at least one participant to an understanding threshold, the period of misunderstanding being a period of time during which the level of understanding of the at least one participant is below the understanding threshold;
    based at least in part on determining that the level of understanding of the at least one participant is below the understanding threshold, analyzing, by the processing device, the presentation to associate the period of misunderstanding with a portion of the presentation wherein the analyzing comprises performing tokenization and part-of-speech tagging of text from the portion of the presentation associated with the period of misunderstanding;
    re-presenting to the at least one participant the portion of the presentation associated with the period of misunderstanding; and
    capturing, by a second imaging device, video of the presentation and a presenter.

2. The computer-implemented method of claim 1, wherein re-presenting to the at least one participant the portion of the presentation associated with the period of misunderstanding comprises presenting, in a different way, the portion of the presentation associated with the period of misunderstanding.

3. The computer-implemented method of claim 1, wherein the at least one participant is geographically remote from the presenter.

4. The computer-implemented method of claim 1, wherein analyzing the plurality of images to determine a level of understanding of the at least one participant comprises performing a microexpression facial analysis.

5. The computer-implemented method of claim 1, further comprising
    capturing, by an audio device, audio associated with the presentation.

6. The computer-implemented method of claim 1, wherein the at least one participant comprises a plurality of participants.

7. The computer-implemented method of claim 6, wherein capturing the plurality of images comprises capturing a plurality of images of each of the plurality of participants.

8. The computer-implemented method of claim 7, wherein determining the period of misunderstanding comprises determining a period of misunderstanding for at least one of the plurality of participants.

9. The computer-implemented method of claim 7, wherein determining the period of misunderstanding comprises determining a collective period of misunderstanding for the plurality of participants.

10. A system comprising:
    a memory comprising non-transitory computer readable instructions; and
    a processing device for executing the non-transitory computer readable instructions for performing a method for real-time analysis of participant understanding of at least one participant during a presentation, the method comprising:
        capturing, by a first imaging device, a plurality of images of the at least one participant during the presentation;
        analyzing, by the processing device, the plurality of images to determine a level of understanding of the at least one participant;
        determining, by the processing device, a period of misunderstanding of the at least one participant by comparing the level of understanding of the at least one participant to an understanding threshold, the period of misunderstanding being a period of time during which the level of understanding of the at least one participant is below the understanding threshold;
        based at least in part on determining that the level of understanding of the at least one participant is below the understanding threshold, analyzing, by the processing device, the presentation to associate the period of misunderstanding with a portion of the presentation wherein the analyzing comprises performing tokenization and part-of-speech tagging of text from the portion of the presentation associated with the period of misunderstanding;

re-presenting to the at least one participant the portion of the presentation associated with the period of misunderstanding; and capturing, by a second imaging device, video of the presentation and a presenter.

11. The computer-implemented method of claim 10, wherein re-presenting to the at least one participant the portion of the presentation associated with the period of misunderstanding comprises presenting, in a different way, the portion of the presentation associated with the period of misunderstanding.

12. The computer-implemented method of claim 10, wherein the at least one participant is geographically remote from the presenter.

13. The computer-implemented method of claim 10, wherein analyzing the plurality of images to determine a level of understanding of the at least one participant comprises performing a microexpression facial analysis.

14. The computer-implemented method of claim 10, further comprising capturing, by an audio device, audio associated with the presentation.

15. The computer-implemented method of claim 10, wherein the at least one participant comprises a plurality of participants.

16. The computer-implemented method of claim 15, wherein capturing the plurality of images comprises capturing a plurality of images of each of the plurality of participants.

17. The computer-implemented method of claim 16, wherein determining the period of misunderstanding comprises determining a period of misunderstanding for at least one of the plurality of participants.

18. A computer program product comprising:

a non-transitory computer readable storage medium having program instructions embodied therewith, the program instructions executable by a processing device to cause the processing device to perform a method for real-time analysis of participant understanding of at least one participant during a presentation, the method comprising:

capturing, by a first imaging device, a plurality of images of the at least one participant during the presentation;

analyzing, by the processing device, the plurality of images to determine a level of understanding of the at least one participant;

determining, by the processing device, a period of misunderstanding of the at least one participant by comparing the level of understanding of the at least one participant to an understanding threshold, the period of misunderstanding being a period of time during which the level of understanding of the at least one participant is below the understanding threshold;

based at least in part on determining that the level of understanding of the at least one participant is below the understanding threshold, analyzing, by the processing device, the presentation to associate the period of misunderstanding with a portion of the presentation wherein the analyzing comprises performing tokenization and part-of-speech tagging of text from the portion of the presentation associated with the period of misunderstanding;

re-presenting to the at least one participant the portion of the presentation associated with the period of misunderstanding; and capturing, by a second imaging device, video of the presentation and a presenter.

\* \* \* \* \*